F. ZIEMER.
FAUCET.
APPLICATION FILED OCT. 17, 1917.
1,327,850.
Patented Jan. 13, 1920.
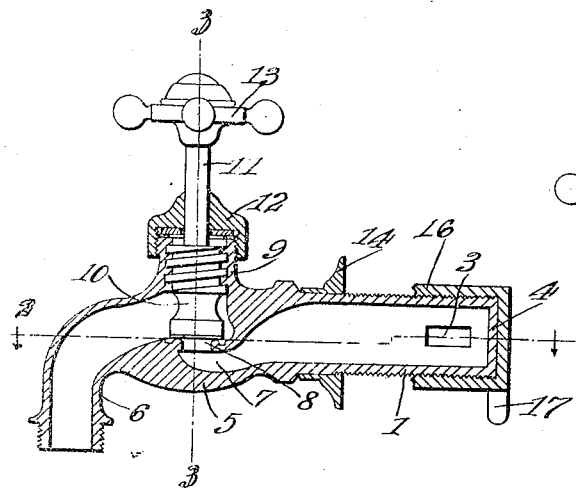
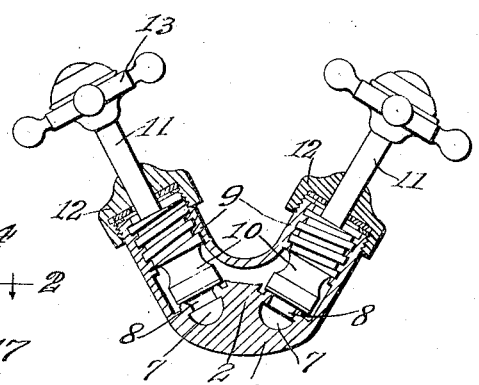
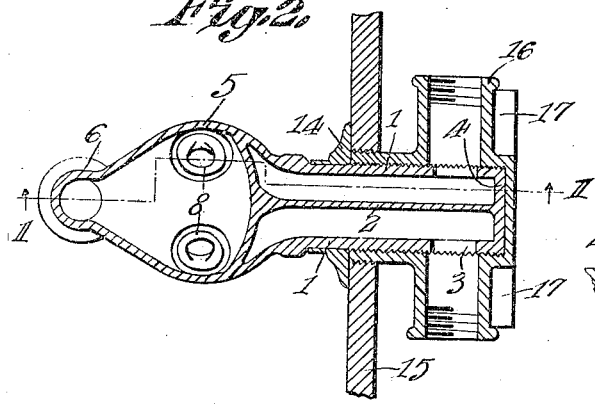
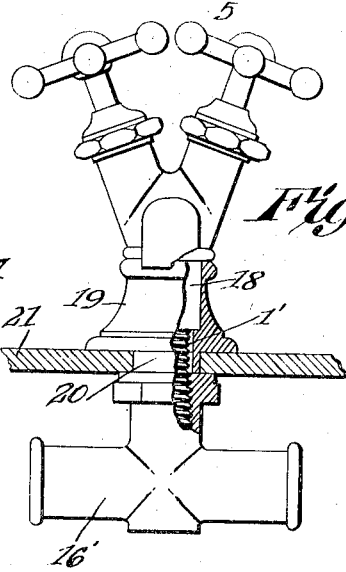
Inventor
Fredrich Ziemer
By C. A. Snow & Co.
Attorneys
Witness

UNITED STATES PATENT OFFICE.

FREDRICK ZIEMER, OF FREEPORT, NEW YORK.

FAUCET.

1,327,850.  Specification of Letters Patent.  Patented Jan. 13, 1920.

Application filed October 17, 1917. Serial No. 197,073.

*To all whom it may concern:*

Be it known that I, FREDRICK ZIEMER, a citizen of the United States, residing at Freeport, Long Island, in the county of Nassau and State of New York, have invented a new and useful Faucet, of which the following is a specification.

The subject of this invention is a faucet, and the objects of the invention are, first, to provide one faucet for both hot and cold water, second, to provide means for connecting the faucet to supply pipes, third, to provide means for locking the faucet in place, fourth, to provide a faucet which may be quickly attached and detached, fifth, to provide a simple, cheap and efficient faucet, that can be used on a wash stand or bath tub.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

A practical embodiment of the invention is shown in the accompanying drawing, wherein:

Figure 1 is a sectional view of a faucet constructed in accordance with the invention taken on the line 1—1 of Fig. 2;

Fig. 2 is a horizontal section taken on the line 2—2 of Fig. 1;

Fig. 3 is a section on the line 3—3 of Fig. 1;

Fig. 4 is a front elevation of a modified form of the invention showing a faucet intended for attachment to a basin, parts being in section.

Referring to the drawing by numerals of reference:

The faucet consists of a cylindrical portion 1 which has a preferably vertically disposed longitudinal division wall 2 therein which divides the portion 1 into two tubes or ducts. Openings or apertures 3 are formed at opposed points on the portion 1 and near one end thereof, and said end is closed by a head 4.

The portion 1 expands into an enlarged portion 5 in which a chamber is formed, and this portion 5 merges into a downwardly curved discharge spout 6.

The ducts formed by the division wall 2 communicate through ducts 7 with the chamber formed in the enlarged portion 5. Valve seats 8—8 are formed about the opening of the ducts 7—7 into the chamber.

Diverging nipples 9—9 rise from the enlarged portion 5 and these nipples are interiorly threaded to receive the threaded portion of the valves 10—10. Each valve 10 is provided with the usual stem 11 which is encircled by a cap 12 adapted to be threaded on the end of a nipple 9. A hand wheel 13 may be secured in the usual manner to the outer end of each stem 11.

A collar or plate 14 encircles the portion 1 of the faucet and rests against the face of the tub 15 for the purpose of providing a neat finish.

A T joint 16 is threaded onto the rear end of the portion 1 and the openings or apertures 3 communicate with opposed branches of the T joint to admit water from a hot and cold water pipe. The T joint 16 may be formed with lugs 17 which are apertured to receive screws for the purpose of securing the T joint to a wall or other support.

The basin faucet shown in Fig. 4 is the same as that just described except that the cylindrical portion 1' extends downwardly from the enlarged portion or body of the faucet.

The faucet is formed with a preferably rectangular portion 18 which is adapted to enter a rectangular socket formed in a collar 19, which surrounds the faucet in the usual manner. The collar 19 also has a rectangular projection 20 which is designed to enter a square opening in the stand top 21. By this means the faucet is locked against revolution and the T joint 16' may be screwed on or off of the threaded cylindrical portion 1' without danger of changing the set of the faucet.

From the foregoing it will be seen that the faucet is designed to be easily handled in casting and finishing, and is adapted to be applied and removed with a small expenditure of effort.

Having thus described the invention, what is claimed as new and sought by Letters Patent, is:

The combination with a joint having opposed inlets and an intermediate screw threaded seat, and a threaded stem projecting from the joint and between the inlets, said stem being opposite the seat, of a faucet divided longitudinally to form separate passages, said faucet having a single discharge spout, separate valves for controlling communication between said spout and the respective passages, said faucet having an exteriorly threaded cylindrical portion engaging the stem and closed at its rear end, there being opposed ports in the cylindrical portions, said closed end engaging the seat in the joint, and establishing communication between the passages and the respective inlets of the joint.

In testimony that I claim the foregoing as my own, I have hereto affixed my signature in the presence of two witnesses.

FREDRICK ZIEMER.

Witnesses:
 CHARLES EPPLE,
 ALFRED M. POST.